Dec. 12, 1967   T. SOUZA, JR   3,357,681
RAILING SYSTEM
Filed Oct. 21, 1965   4 Sheets-Sheet 1
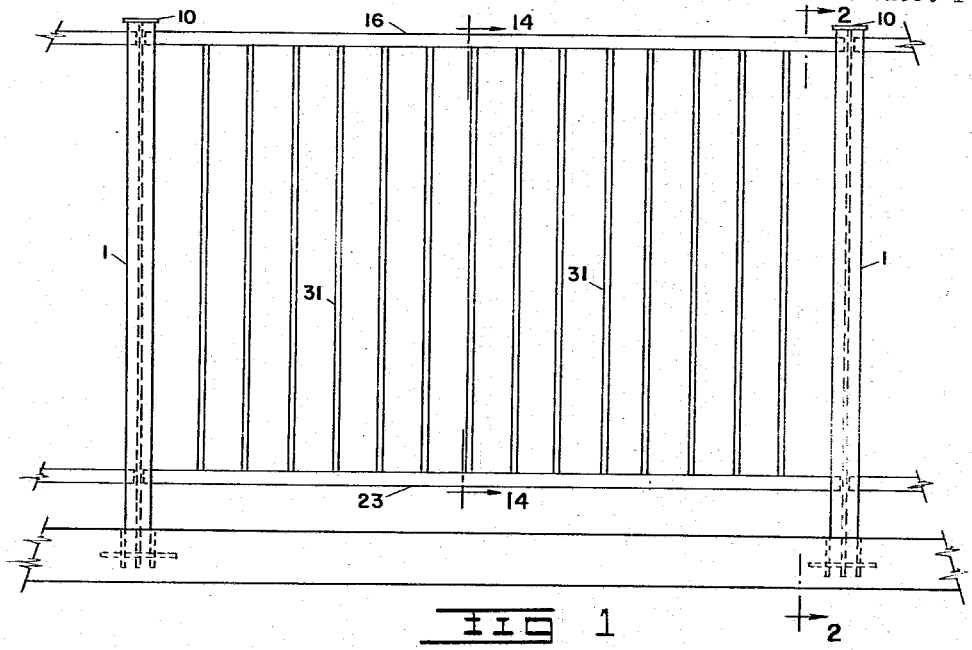
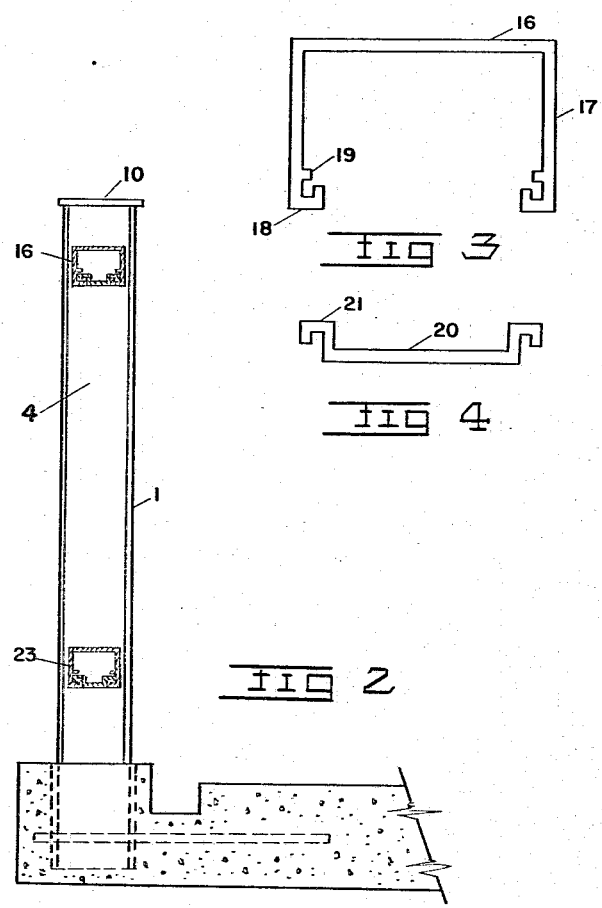
INVENTOR.
THOMAS SOUZA, JR.

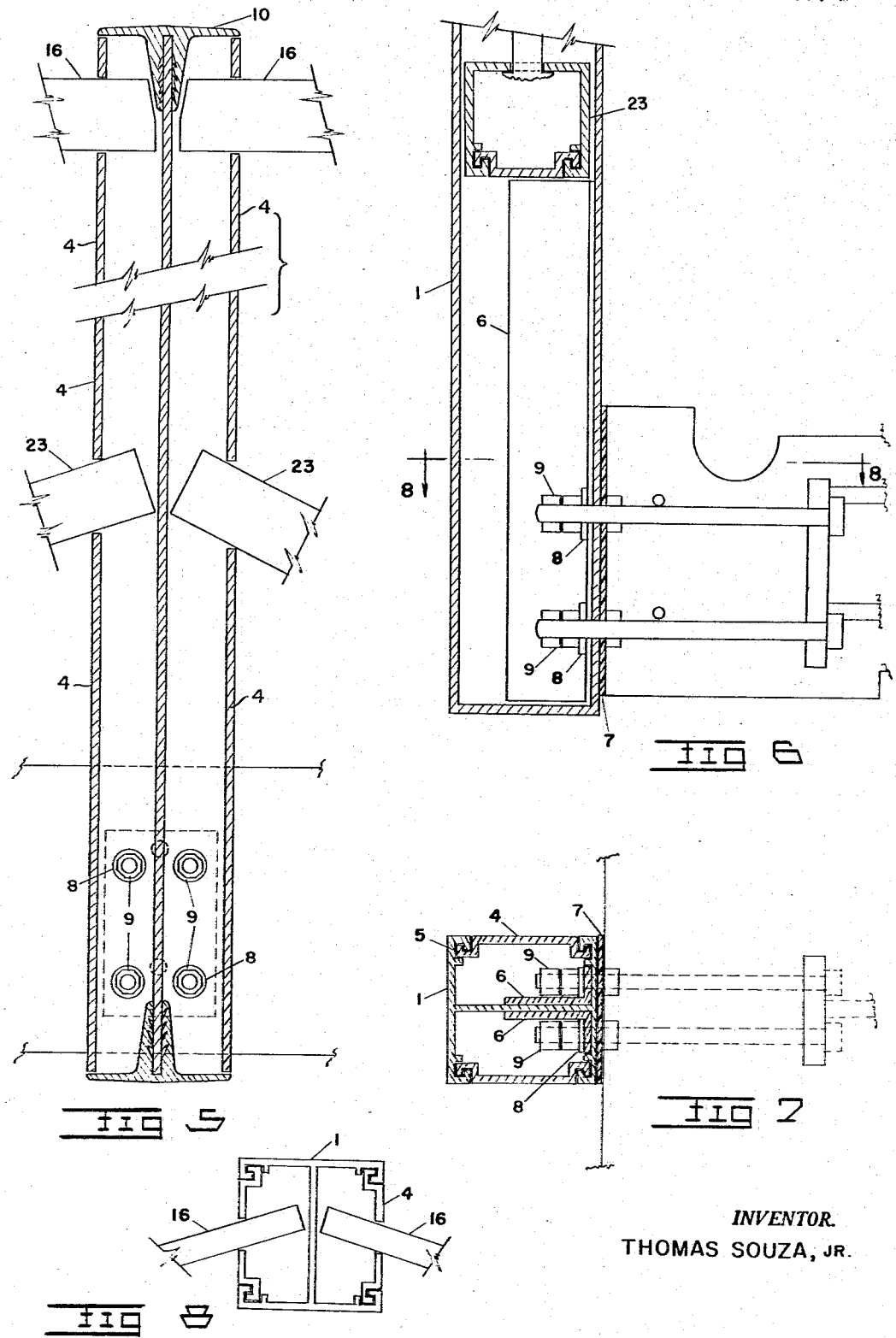

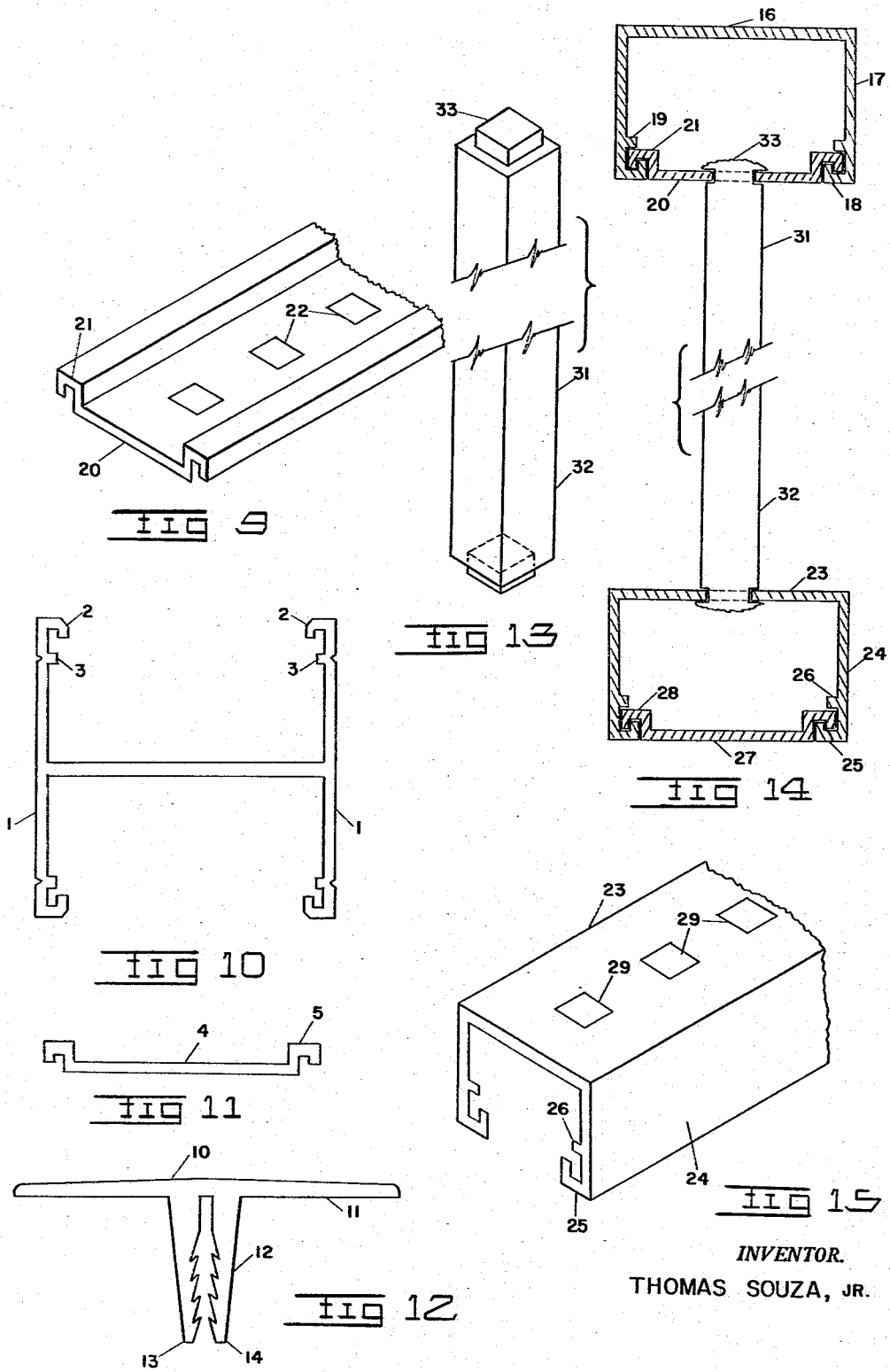

Dec. 12, 1967     T. SOUZA, JR     3,357,681
RAILING SYSTEM
Filed Oct. 21, 1965     4 Sheets-Sheet 4
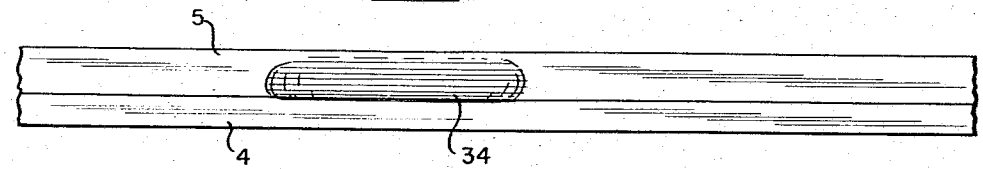
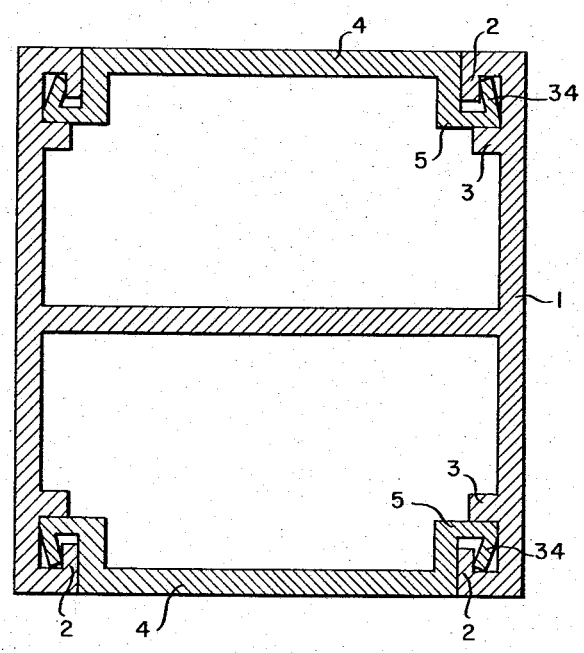
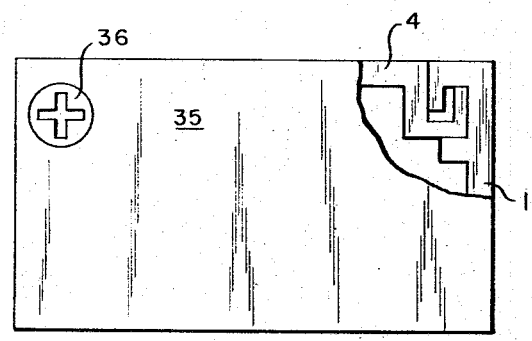
INVENTOR
THOMAS SOUZA, JR.

United States Patent Office 3,357,681
Patented Dec. 12, 1967

3,357,681
RAILING SYSTEM
Thomas Souza, Jr., 173 Kakahiaka St.,
Kailua, Oahu, Hawaii 96734
Filed Oct. 21, 1965, Ser. No. 511,574
7 Claims. (Cl. 256—65)

This application is a continuation-in-part of my co-pending application Ser. No. 333,894, filed Dec. 27, 1963, now abandoned.

The present invention relates to improvements in railing systems and other similar structural and architectural systems.

More particularly, the invention includes I-shaped posts with slides parallel to the stem of the I, U-shaped top and bottom railings with slides that connect the legs of the U, and balusters. The ends of the balusters are fitted within holes in the top and bottom railings and are secured either with or without flattening them. The ends of the top and bottom railings are fitted within openings in the slides or between sections of the slides that are parallel to the stem of the I.

In general, I have conceived a way of working inside a hollow tube which now opens many fabricating methods considered heretofore impossible to perform on hollow sections.

An object of this invention is to provide a railing system which will reduce fabrication and material costs.

Another object of this invention is to provide a railing system which will allow for greater range of structural and architectural applications by reducing and/or eliminating the use of castings and other specialized fittings or fixtures.

Still another object of the present invention is to provide a railing system which will utilize semi-hollow and solid sections rather than hollow sections.

Yet another object of the present invention is to provide a railing system which will utilize slides that are constructed to allow for resistance against failure and slipping in all directions except in a sliding direction.

A further object of the present invention is to provide a railing system which will allow its component parts to be made in any geometric shape or structural strength desired and which are adapted for installation without any elaborate tooling to provide a customized appearance.

A still further object of the present invention is to provide a railing system which utilizes little or no welding, fittings, and clips or other fasteners.

Yet another object of this invention is to provide a railing system that will lessen the cost of installation by simplifying the necessary on-job connections by the elimination of fittings and the utilization of slide connections and random rail butts.

A further object of this invention is to provide a railing system which is simple to install because welding and connector fittings are minimized or eliminated.

A still further object of this invention is to provide a railing system whereby components thereof may be fabricated beforehand and utilized as required.

Yet another object of this invention is to provide a railing system which may be assembled by a minimum skilled laborer with only a hammer.

A further object of this invention is to provide a railing system which utilizes opened hollow sections and slides.

A still further object of this invention is to provide a railing system which may be built around a curved object without bending any railings.

Yet another object of this invention is to provide a railing system which may be built at different elevations without bending any railings.

Another important object and advantage of the invention is to provide a railing system assembly and method of assembly wherein interconnecting U-shaped and slide members, which normally may be relatively freely slidable, are relatively crimped or otherwise deformed along their connecting structure to effect a frictional engagement between the members so that they may be assembled in any desired fixed relative position.

Other objects, features and advantages of the present invention will be readily apparent from the following detailed description taken in connection with the accompanying drawings in which:

FIG. 1 is the front view of the preferred embodiment of my invention as anchored in a base and partly broken away to show a single balustrade section;

FIG. 2 is a sectional view taken along line 2—2 in FIG. 1;

FIG. 3 is an elevational view of the top railing;

FIG. 4 is an elevational view of the slide of the top railing;

FIG. 5 is a cross sectional view of a modified form of my invention;

FIG. 6 is a cross sectional view of a portion of a modified form of my invention shown in FIG. 5 with the addition of an angle and the deletion of a slide;

FIG. 7 is a sectional view taken along line 7—7 in FIG. 6 with the addition of the deleted slide;

FIG. 8 is a top view of a post, two slides, and two railings with the railings at an angle to the post;

FIG. 9 is a perspective view of the slide of the top railing;

FIG. 10 is a top view of a post;

FIG. 11 is a top view of the slide of a post;

FIG. 12 is a front view of one form of the cap of the post;

FIG. 13 is a perspective view of a baluster;

FIG. 14 is a cross sectional view of the top railing, baluster, and bottom railing of the preferred embodiment of my invention;

FIG. 15 is a perspective view of a fragment of the bottom railing;

FIG. 16 is a side elevational view of a slide fragment showing a portion of its side end deformed inwardly for frictional engagement with the U-shaped member when assembled;

FIG. 17 is a transverse sectional view of an assembled post taken through the deformed portion of the slides as shown in FIG. 16; and FIG. 18 is an end view of a railing or post partially broken away and showing a cap secured to the assembly by screw means which also deforms the connecting structure between the U-shaped and slide members.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings wherein like reference numerals refer to like and corresponding parts throughout the several views, the preferred embodiment of the invention illustrated in the drawings includes I-shaped posts 1, caps 10, top railing 16, bottom railing 23, and balusters 31.

The arms of posts 1 as shown in FIG. 10 have L-shaped projections 2 at their ends and slide retaining projections 3 near their ends. Slides 4, whose U-shaped side ends 5 fit within the space provided by the L-shaped projections 2 and slide retaining projections 3, are utilized to provide a pleasing appearance and to hold the ends of the top railing 16 and bottom railing 23. Slide 4 may be made in one piece with two openings for the top and bottom railings or in several sections or pieces as shown in FIG. 5.

The post 1 may be secured to a structure by setting the bottom thereof in a socket, filling the socket with "Por-Rok" Cement Grout, and allowing it to set or by anchoring the bottom thereof to the side of a structure by bolting the post thereto (see FIGS. 5–7). In the latter case, two angle irons 6 may be utilized to provide additional support to the bottom of post 1, a neoprene gasket 7 may be placed between the post and the structure, and neoprene grommets 8 may be placed between the nuts 9 and the surface of the angle irons.

Cap 10 is fitted on top of the post 1. The form of cap 10 as shown in FIG. 12 includes a cover 11 and a fastener 12. Fastener 12 includes two converging toothed projections 13 and 14. The cap is secured to the post by the spaced teeth of the two projections 13 and 14 which grip the stem of the I. When the bottom of the post is secured to the side of a structure, a cap may be secured to the bottom of the post in a similar manner (see FIG. 5).

The top railing 16 as shown in FIG. 14 has a U-shaped structure 17 with L-shaped projections 18 at its ends and slide retaining projections 19 near its ends. A slide 20, whose U-shaped side ends 21 fit within the space provided by the L-shaped projections 18 and slide retaining projections 19, conceals the inside of the structure 17. The slide may have evenly spaced holes 22 as shown in FIG. 9 throughout its length for a purpose to be disclosed later. The top railing may serve to cover the top of post 1 in lieu of cap 10, if it is so desired.

The bottom railing 23 is substantially identical in structure to the top railing 16. It has as shown in FIG. 14 a U-shaped structure 24 with L-shaped projections 25 at its ends and slide retaining projections 26 near its ends. A slide 27, whose U-shaped side ends 28 fit within the space provided by the L-shaped projections 25 and slide retaining projections 26, provides concealment to the inside of the U. Evenly spaced holes 29 as shown in FIG. 15 may be distributed throughout the length of the back of the U-shaped structure 24 for a purpose to be disclosed later.

Each baluster 31 as shown in FIG. 13 has a stem 32 and ends 33. The ends are smaller in area than the area of the stem. The ends of the balusters are secured to the top and bottom railings by placing them in the holes 22 of the slide 20 and in the holes 29 of the bottom railing 23 and then flattening or upsetting them as shown in FIG. 14. Balusters may be made so that the stem and ends have the same area, in which case the ends are not flattened but extend throughout the depth of the railings and neoprene grommets may be used at each of the holes 22 and 29, if a closer fit is desired.

Referring now to FIGS. 16 and 17, the posts 1 and slides 4 are illustrated for exemplification but it is to be understood that this modified form of the invention also applies to the top railing 16 and slide 20 and to bottom railing 23 and slide 27, the interconnecting structure between the U-shaped members and their slides being essentially the same.

As shown in FIGS. 16 and 17, a portion of the U-shaped side ends 5 of a slide 4 is crimped or otherwise deformed as indicated at 34 in any desired manner, conveniently by merely striking the side with a blunt instrument such as a hammer. The deformation is preferably inwardly in the direction of the L-shaped projections so as to provide frictional engagement between the relatively sliding members when they are assembled. The degree of frictional engagement may be selectively adjusted by varying the area of deformation either by length or by number along the sides of the slides to provide relatively loose or tight frictional contact. For example, only a relatively snug fit with minor friction may be desired and the slide may then be inserted manually or with slight tapping. On the other hand, particularly where slide sections are employed and cross-members 16 and 23 are to be supported, such as shown in FIG. 5, greater friction may be desired so that the slide sections may be forcefully driven into firm supporting engagement with cross-members.

FIG. 18 illustrates another manner of deforming the structure interconnecting the U-shaped and slide members such as indicated at 1 and 4 in an end construction wherein a plate or cap 35 is positioned by screws 36 driven between the U-shaped and slide connection structure to spread the same. A screw or rivet type obstruction anywhere along the seam between the slide and its parent section will have a similar restricting effect.

My railing system may be assembled in many ways depending on the aesthetic value required and structural sections used. An example of an assembly of the preferred embodiment of my invention is as follows: (1) secure posts 1 to a structure by settling their bottoms in a cavity, filling the cavity with Cement Grout, and allowing the Cement Grout to set; (2) secure one end of the balusters 31 to the back of the U-shaped structure 24 by inserting said end through the holes 29 and flattening it; (3) secure the other end of the balusters 31 to the slide 20 by inserting said end through the holes 22 and flattening it; (4) fit the slide 20 within the space formed by the L-shaped projections 18 and slide retaining projections 19 of the top railing 16; (5) fit the slide 27 within the space formed by L-shaped projections 25 and slide retaining projections 26 of the bottom railing 23; (6) fit the ends of the top and bottom railings within the openings in the slides 4; (7) fit the slides on the posts 1; and (8) secure caps 10 to the top of each post.

Where the slides 4 are made of several sections as shown in FIG. 5 and the width of the top and bottom railings are substantially equal to the width of the slides 4, all of the above cited steps are followed except step 6. Instead of fitting the ends of the top and bottom railings within the openings in the slides 4, the said ends are fitted between sections of the slides 4.

Where the posts 1 are secured to the side of a structure, all of the steps except step 1 are followed. In addition, a cap is placed on the bottom of each post if the bottom of the posts is above the ground for aesthetic purpose.

When balusters having the same area throughout are utilized and the width of the top and bottom railings is substantially equal to the width of the post slides 4, the following assembly method may be used: (1) secure at least two posts 1 to a structure by bolting the bottom thereof to the structure; (2) fit the bottom section of slides 4 on the posts; (3) fit the slide 27 within the space formed by the L-shaped projections 25 and slide retaining projections 26 of the bottom railing 23; (4) fit the slide 20 within the space formed by the L-shaped projections 18 and slide retaining projections 19 of the top railing 16; (5) lay the ends of the bottom railing 23 on the top of the bottom section of slides 4 so that they extend beyond the depth of the section towards the stem of the posts 1; (6) fit the middle section of slides 4 on the posts; (7) insert one end of the balusters 31 into the holes 29 of the bottom railing so that it touches the slide 27; (8) lay the ends of the top railing 16 on the top of the middle section of slides 4 on the posts so that they extend beyond the depth of the section towards the stem of the posts 1 and so that the other end of the balusters 31 fits into the holes 22; (9) fit the top section of the slides 4 on the posts; and (10) secure caps 10 to the top of each post.

As can be seen by the assembly of my railing system as stated above, my invention requires no welds, rivets, or clips. However, a weld, rivet, or clip may be used to simplify a particular condition. All that is required is an instrument, such as a power hammer, to flatten or upset the ends of the balusters. Thus, minimum skilled or unskilled laborers may be utilized to assemble my invention as contrasted to the railing systems in existence which require skilled workmen to install.

Moreover, my invention allows for greater range of structural and architectural applications by reducing and/or eliminating the use of castings and other specialized fittings or fixtures.

The components of my invention are less expensive to fabricate in comparison to present day components because semi-hollow and solid sections are cheaper to produce than hollow sections. Moreover, the components of my railing system may be made into any geometric shape or have any structural strength desired, thus allowing for greater variety of application.

Present day railing systems which use welding to fasten their component parts require grinding and polishing. Anodizing may also be required which is expensive because of the large units to be handled. My invention eliminates the need for grinding and polishing and yet does not sacrifice appearance as the flattened ends of the railings and balusters are hidden from view by the use of slides. Where anodize is required, pre-anodized or other pre-colored stock sections may be utilized with substantial cost savings.

It will be noted that each of the slides of my invention has U-shaped ends which fit within the space formed by the L-shaped projections and slide retaining projections of its mating structure so that the slide is free to move in a sliding direction only. This movement can be also restricted if desired after the slide has been installed. It will be apparent also that the slides may be freely movable in their tracks or friction fitted to be inserted by force into selected fixed position.

It will also be noted that by allowing the ends of the top and bottom railings to fit within openings in the slides or between the sections of the slides there is a greater tolerance allowed as to the length of the railings and as to the securing of the posts. The length of the railings need only be long enough so that its ends extend the depth of the slides. The distance between the ends of the railings and the stem of the posts is the tolerance that is allowed. Because of this tolerance, posts that are inadvertently set off-center need not be reset. In addition, because of this tolerance, may invention may be built around a curved object or at different elevations without bending any railing. The bottom railings 23 in FIG. 5 are inclined to indicate that my invention may be built at different elevations without bending any railing. The railings 16 in FIG. 8 are drawn at an angle to indicate that my invention may be built around a curved object without bending any railing.

Although but a few embodiments of the invention have been disclosed and described herein, it is obvious that many changes may be made in the size, shape, arrangement, and detail of the various elements of the invention without departing from the scope of the novel concepts of the present invention.

I claim:

1. A structural system which comprises,
a substantially U-shaped member,
opposed inwardly and upwardly extending projections on the ends of said member,
opposed slide retaining projections extending inwardly of the inner side surfaces of said member and near the ends of said member,
adjacent inwardly and upwardly extending projections and slide retaining projections on each side surface of said member being spaced apart,
and a slide member,
substantially U-shaped side ends on said slide member, the said U-shaped side ends fitting in the spaces between said inwardly and upwardly extending projections and slide retaining projections and in engagement with said projections to support said slide member on said U-shaped member.

2. The structure of claim 1 wherein a portion of one of the interfitting side ends and projections is deformed toward one of the others to provide frictional engagement between said slide member and said U-shaped member.

3. The structure of claim 1 wherein a portion of one of the side ends is deformed toward its adjacent upwardly extending projection to provide frictional engagement between said slide member and said U-shaped member.

4. The structure of claim 1 wherein the system is a railing system and wherein the slide member has an opening, additionally including,
a cross-member for the railing system, and
an end of said cross-member being inserted in said opening.

5. The structure of claim 1 wherein the system is a railing system and wherein there are a plurality of slide members, selected adjacent slide members being spaced apart to provide an opening, additionally including,
a cross-member for the railing system, and
an end of said cross-member being inserted in said opening.

6. A railing system including two I-shaped posts, each having opposed L-shaped projections and slide retaining projections on their inner side surfaces,
a U-shaped top railing,
a U-shaped bottom railing,
the said railings having opposed L-shaped projections and slide retaining projections on their inner side surfaces,
the said bottom railing having a plurality of holes in the back thereof,
a slide having a plurality of spaced holes therein positioned between the sides of the top railing and another slide positioned between the sides of the bottom railing,
a series of balusters with ends that are smaller in dimensions than their middle portions,
one end of each baluster being inserted in a hole in the upper railing slide and flattened and the other end being inserted in a hole in the back of the bottom railing and flattened,
said slides having U-shaped side ends fitted within the space formed by the L-shaped projections and slide retaining projections of the said railings,
other slides having U-shaped side ends fitted within the space formed by the L-shaped projections and slide retaining projections of the posts, and
the ends of said top and bottom railings being secured to said other slides.

7. A railing system including at least two U-shaped posts,
a slide for each post,
a U-shaped top railing,
a slide for the top railing having openings,
a U-shaped bottom railing having back openings,
a slide for the bottom railing,
a series of balusters,
and a cap secured to each post,
the said posts and railings each having opposed L-shaped projections and slide retaining projections on their inner side surfaces,
the said slides each having U-shaped side ends fitted within the space formed by said L-shaped projections and slide retaining projections on said posts and railings, the said post slides having openings for the ends of the top and bottom railings, and the said balusters being secured at one end to the top railing slide and at the other end to the back of the bottom railing by flattening the ends after they are inserted in said openings.

References Cited

UNITED STATES PATENTS

| | | | |
|---|---|---|---|
| 1,122,997 | 12/1914 | Pearson | 256—22 |
| 1,376,150 | 4/1921 | Miller | 256—65 |
| 1,570,310 | 1/1926 | Ljungberg et al. | 52—732 |
| 2,456,049 | 12/1948 | Carrozza | 52—731 |
| 2,590,929 | 4/1952 | Bush | 256—22 |
| 2,766,855 | 10/1956 | Johnson et al. | 52—732 X |
| 2,808,233 | 10/1957 | Spescha | 256—22 |
| 3,195,864 | 7/1965 | Case | 256—65 |

FOREIGN PATENTS

| | | |
|---|---|---|
| 570,548 | 9/1958 | Belgium. |
| 178,114 | 2/1962 | Sweden. |
| 350,981 | 2/1961 | Switzerland. |

DAVID J. WILLIAMOWSKY, *Primary Examiner.*

D. L. TAYLOR, *Assistant Examiner.*